Nov. 21, 1961 R. A. JONES ET AL 3,009,321
CERAMIC-LINED PILOTS FOR TURBO-JET COMBUSTORS
Filed May 21, 1958 2 Sheets-Sheet 1

INVENTORS
RODNEY A. JONES AND
HERBERT R. HAZARD
BY
ATTORNEYS

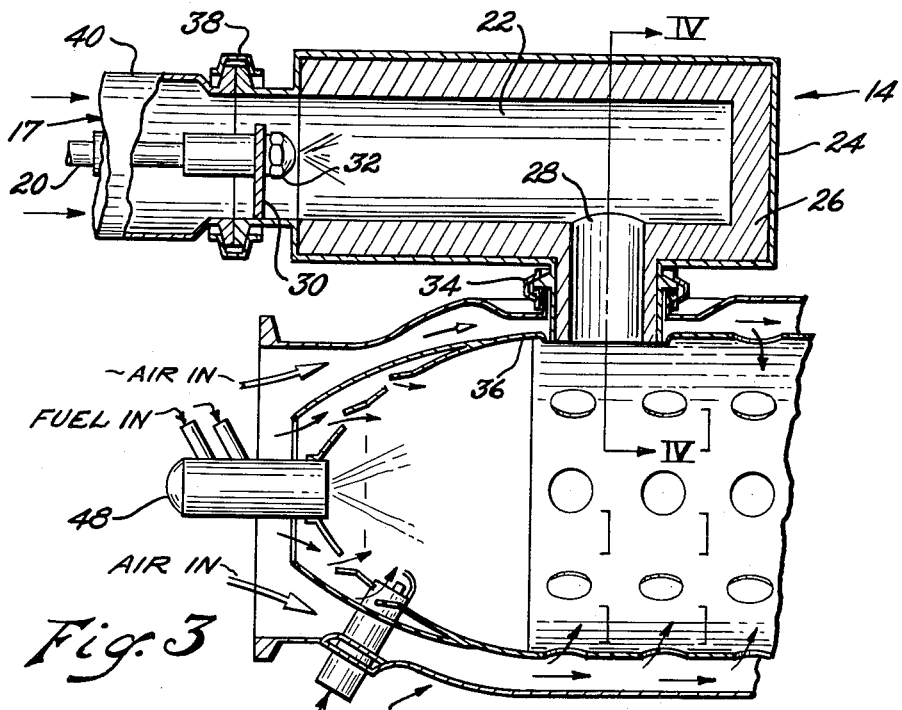
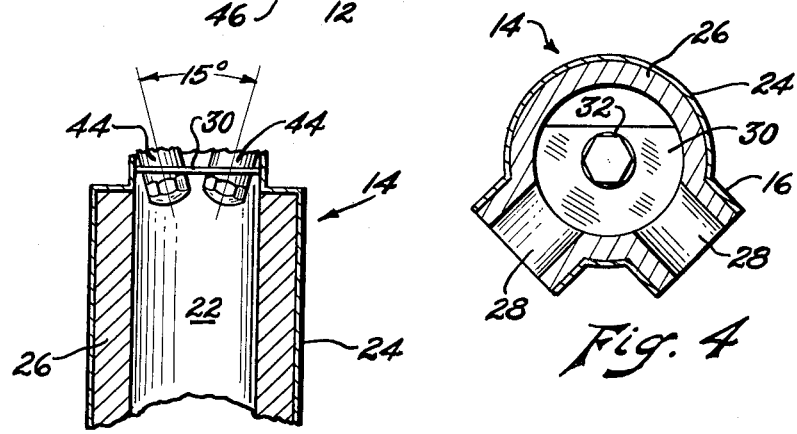
INVENTORS
RODNEY A. JONES
AND HERBERT R. HAZARD
BY
ATTORNEYS 3,009,321
CERAMIC-LINED PILOTS FOR TURBO-JET COMBUSTORS
Rodney A. Jones, Baltimore, Md., and Herbert R. Hazard, Columbus, Ohio, assignors to the United States of America as represented by the Secretary of the Air Force
Filed May 21, 1958, Ser. No. 736,938
4 Claims. (Cl. 60—39.82)

The present invention relates generally to combustion engines and as illustrated herein, relates more particularly to ceramic lined pilot devices for igniting the combustors of turbo-jet aircraft engines.

It is desirable to permit re-ignition of engines during flight thus affording interesting tactical advantages. The descent angle could be steeper if the engine were cut off, thus providing drag instead of thrust for descent and, as a result, making it possible to descend faster for any limiting flight speed.

Quick and positive re-ignition means permits considerable economy in operation since the engines could be cut off for normal descent from high altitude and then relighted for landing. This would result in increased range of the aircraft since considerable fuel is normally required for descent. An ignition device for relighting combustors during descent must be quick and positive.

One object of the present invention is to provide a pilot ignition chamber which is designed to re-ignite combustors under flight conditions. To this end, and as illustrated, the present pilot device comprises a pilot chamber having a hot ceramic lining which considerably reduces quenching effects at high altitudes.

The present invention is effective to improve the performance of turbo-jet combustors not only by providing positive ignition under all flight conditions but also to extend the lean operating limit of the combustor. The ceramic pilot chamber provides a space or a volume for nearly complete combustion of the fuel fed into it. The ceramic chamber is substantially uncooled and the hot ceramic lining minimizes quenching effects at high altitudes which are serious in cooled metal combustors of small size or in the usual type of torch ignition.

With the above and other objects and features in view, the invention will now be described with particular reference to a preferred embodiment thereof and which is illustrated in the accompanying drawings and in which:

FIG. 3 is a sectional view of a preferred form of pilot igniter;

FIG. 4 is a sectional view taken along the lines IV—IV of FIG. 3; and

FIG. 5 is a fragmentary sectional view showing another embodiment of fuel supply nozzles.

Figure 1:
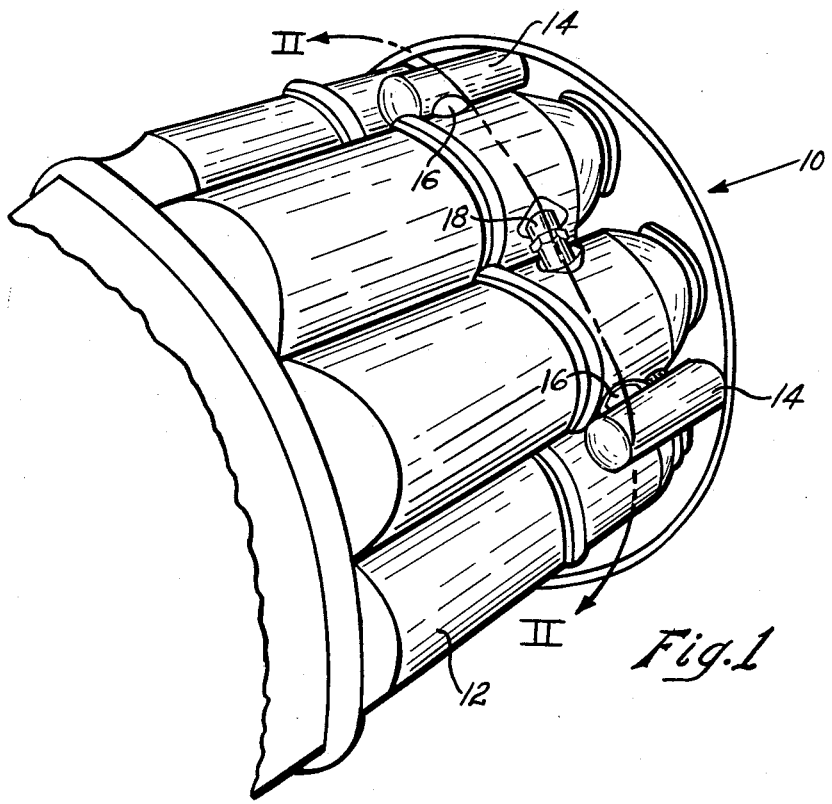
FIG. 1 is a schematic view of a combustor in which a preferred embodiment of the present invention is incorporated.

The illustrated embodiment of the invention comprises a turbo-jet combustion section 10 having a plurality of combustion chambers 12. The combustion chambers 12 are fired in pairs by pilot chambers 14 which are connected to the combustion chambers 12 at the crossover-tube location, shown best in FIG. 1. Pilot chambers 14 are provided for each pair of combustion chambers 12 and fire through crossover tubes 16 into the tubes 12. In the alternate spaces between the combustion chambers 12, standard crossover tubes 18 are provided. By the use of such a system, all of the combustion chambers 12 and the pilot chambers 14 can be ignited from a single suitable ignition device such as a spark plug 46 since the flame propagates through the pilot chambers 14 and the crossover tubes 16 and 18 as well as through the combustion chambers 12.

The pilot chambers 14 are placed parallel to the turbo-jet combustion chambers 12 and fire into them. Air for the pilot chambers 14 is obtained from the compressor outlet through a special opening, and enters the pilot chamber 22. Fuel is supplied by a separate fuel system 20 at rates such that the fuel-air ratios in the pilot chamber 22 are approximately constant under substantially all flight conditions.

Figure 2:
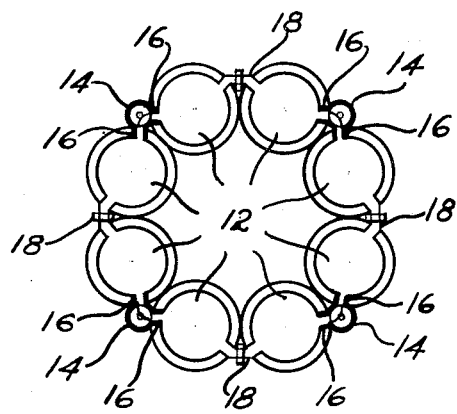
FIG. 2 is a view in section taken along the line II—II of FIG. 1.

The pilot chambers 14 are each substantially identical in construction and hence only one of these will be described in detail. Each pilot 14 comprises a thin stainless steel casing 24 having a ceramic lining 26 formed of a suitable insulating fire-brick and sealed with a suitable ceramic plaster. The pilot chamber 14 is provided with a pair of outlets 28 which are also likewise lined with suitable ceramic material. The outlets 28 are each connected to adjacent combustion chambers 12, as shown best in FIGS. 1 and 2. The pilot chamber 22 is provided adjacent to its forward end with a flame stabilizing plate 30 secured to a pressure-atomizing fuel nozzle 32. The pilot chambers 14 are secured to the combustor chambers 12 by securing flanges 34 on the outlets 28 to flanges 36 on the combustor chambers 12. The forward end of the pilot chamber 14 is provided with an attaching flange 38 to which is secured, by V-band connector and flanges, or other suitable device, a duct or chamber 40 into which air at compressor-outlet pressure is fed through duct 40. The fuel pressure entering the pilot chamber 22 (as hereinbefore stated) is so controlled that the fuel-air ratio is substantially stoichiometric. The air pressure is equal to compressor-discharge pressure, and thus varies with engine rotating speed and altitude flight speed.

The pilot chamber 22 may also have a duplex fuel system as shown in FIG. 5. Two fuel nozzles 44 are placed side by side on the stabilizing plate 30 and are inclined toward each other at an angle of about 15° to obtain even flame distribution at the outlets of the pilot chamber 22.

The pilot chambers 22 are not each provided with ignitors since the flame will propagate from one combustion chamber 12 through each pilot chamber 14 and crossover tube 18 to the adjacent combustion chamber 12 so that all combustion chambers and pilot chambers are ignited almost instantly. The fuel to the combustion chambers 12 is supplied from a different fuel system through fuel nozzles 48, so that the pilot chambers 14 and the combustion chambers 12 are supplied with fuel independently of each other. This is desirable since the fuel supply to the pilot chambers 14 must be controlled separately to maintain an adequate flame in each of the pilot chambers 22.

After the combustion chambers 12 have been ignited and the pilot chambers 14 have been ignited therefrom, a flame is maintained at nearly stoichiometric conditions in each of the pilot chambers 22. The ceramic lining 26 becomes heated to a high temperature which is maintained even though fuel flow to the combustion chambers 12 is cut-off. The ceramic lining 26 is an effective heat insulator and hence loss of heat through the walls of the pilot chambers 14 is at a minimum. The hot ceramic lining 26 permits high temperature burning gases to be discharged from the pilot chambers 22 to the combustion chambers 12. As a result, relighting of the combustion chambers 12 is more certain and the fuel-air ratio for lean-mixture blow-out is extended from 0.002 (100° F. temp. rise) to 0.0006 (30° F. temp. rise) provided that the fuel-air ratio in the pilot chambers 22 is substantially stoichiometric. The pilot chambers 14, in other words, are effective to ignite the combustion chambers 12 under full engine speed at any fuel-air ratio above 0.0006, which is leaner than the lean blow-out limit for combustors equipped with standard torch igniters of cooled metal construction; the hot ceramic lining 26 minimizes quenching effects at high altitudes which would be serious in combustors and pilots of cooled metal construction.

For the best results and to provide flame stability at minimum operating pressures, the inside diameter of the pilot chamber 22 should not be appreciably less than three inches with an over-all length of approximately 10 inches. A pilot combustion chamber of this size has sufficient volume for nearly complete combustion of the fuel fed into it. Substantially complete combustion permits maximum temperature of the ceramic lining 26 and minimizes the quenching effects at high altitude, heretofore referred to.

The range of fuel-air ratios over which the pilot chambers 14 will operate is sufficiently broad to permit use of a relatively simple fuel-control system which is designed to supply fuel at a rate proportional to pressure of air at the compressor outlet. The pilot chamber will operate effectively over a range of pressures from 3 p.s.i.a. to 95 p.s.i.a. The principal effects of the low pressure is to narrow the range of the fuel-air ratio over which the chamber 22 will maintain a flame. This effect is noticeable up to pressures of 15 p.s.i.a. above which the fuel-air ratio may vary between wider limits.

Having thus described our invention, what we claim as new and desire to secure by Letters Patent of the United States is:

1. In a fluid fuel combustion unit for turbo-jet engines, a plurality of pairs of combustion chambers, ignition pilot devices between said pairs of combustion chambers and having outlets extending into their adjacent combustion chambers, ceramic linings in said pilot devices arranged to be maintained at high temperatures under operating conditions, means capable of supplying said pilot devices with fuel and air in a fixed ratio to maintain a constant flame in said pilot devices, separate means for supplying fuel and air into said combustion chambers, means for providing a passageway between combustion chambers, and means in one of said combustion chambers for igniting the fuel and air supplied thereto.

2. In a fluid fuel combustion unit for turbo-jet engines, a plurality of combustion chambers, means for supplying fuel and air to said combustion chambers, ignition pilot devices interposed between alternate pairs of combustion chambers and having outlets thereinto, means forming communicating passages between said pairs of combustion chambers, ceramic linings in said pilot devices for maintaining said devices at high temperatures, means distinct from said supply means for said combustion chambers capable of supplying air and fuel in stoichometric ratio to said pilot devices to permit full utilization of pilot fuel under all operating conditions and means in one of said combustion chambers for igniting the fuel and air supplied thereto.

3. In a fluid fuel combustion unit for turbo-jet engines, a plurality of combustion chambers, means for supplying fuel and air to said chambers, ignition pilot devices interposed between alternate pairs of combustion chambers and having outlets thereinto, ceramic linings in said pilot devices for maintaining said devices at high temperatures to insure combustion of lean fuel mixtures, means providing communicating passages between alternate pairs of combustion chambers to permit ignition of all chambers and all pilot ignition devices from a single source, means for igniting the fuel and air in at least one of said chambers, and means independent of the fuel and air supplying means for said combustion chambers capable of supplying fuel and air to said ignition pilots in stoichiometric ratio to insure continuous ignition of said pilots under all conditions of use.

4. In a fluid fuel combustion unit for turbo-jet engines, the combination of a plurality of combustion chambers, means for supplying fuel and air to said chambers, a plurality of ignition pilot devices interposed between alternate pairs of combustion chambers and having outlets thereinto, ceramic linings in said pilot devices for maintaining said devices at high temperatures to effectively prevent quenching of the flame at low temperatures and to insure combustion with lean fuel mixtures, means providing communicating passages between alternate pairs of combustion chambers to permit ignition of all chambers and all pilot ignition devices from a single source, means for igniting the fuel and air in one of said chambers, and means independent of the fuel and air supplying means for said combustion chambers capable of supplying fuel and air to said ignition pilots in stoichiometric ratio.

References Cited in the file of this patent

UNITED STATES PATENTS

| 2,498,263 | Goddard | Feb. 21, 1950 |
| 2,500,334 | Zucrow | Mar. 14, 1950 |
| 2,625,011 | Allen et al | Jan. 13, 1953 |
| 2,780,916 | Collins | Feb. 12, 1957 |
| 2,814,339 | Aubert | Nov. 26, 1957 |
| 2,867,979 | Mullen | Jan. 13, 1959 |

FOREIGN PATENTS

| 693,846 | Great Britain | July 8, 1953 |